United States Patent Office 3,071,441
Patented Jan. 1, 1963

3,071,441
PREPARATION OF STABILIZED SULFUR DICHLORIDE
John H. Schmadebeck, Lewiston, N.Y., assignor to Hooker Chemical Corporation, Niagara Falls, N.Y., a corporation of New York
No Drawing. Filed Nov. 12, 1959, Ser. No. 852,171
8 Claims. (Cl. 23—205)

This invention relates to a method of preparing sulfur dichloride. More particularly, this invention also relates to a sulfur dichloride composition stabilized against decomposition.

Sulfur dichloride is used extensively as a chemical intermediate or as a reagent in the preparation of organic acid anhydrides, insecticides, rubber cements, rubber substituents, and lubricant additives.

Sulfur dichloride may be prepared by the chlorination of sulfur, sulfur monochloride, or mixtures thereof. Typical methods are disclosed in United States Patent No. 875,231, issued December 31, 1907; No. 961,530, issued June 14, 1910; and No. 1,341,423, issued May 20, 1920. Sulfur dichloride produced by conventional procedures is generally an equilibrium mixture of sulfur dichloride and sulfur monochloride containing between about sixty-five and about eighty percent by weight of the dichloride.

At atmospheric pressure, the boiling point of sulfur dichloride is about fifty-nine degrees centigrade and the boiling point of sulfur monochloride is about one hundred and thirty-eight degrees centigrade. Thus, fractional distillation can be employed to separate sulfur dichloride from sulfur monochloride. However, sulfur dichloride tends to decompose into sulfur monochloride and $Cl_2$ at temperatures above about fifty-nine degrees centigrade, and the recovery of pure sulfur dichloride by such a technique is relatively low. In addition, the pure product decomposes upon standing at room temperature in accordance with the equation (1) 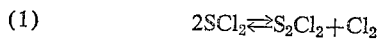
$$2SCl_2 \rightleftharpoons S_2Cl_2 + Cl_2$$

and eventually forms the aforesaid equilibrium mixture.

Chlorine can be dissolved in the equilibrium mixture of sulfur dichloride and sulfur monochloride to produce substantially pure sulfur dichloride. However, this product is also unstable and decomposes upon standing to produce the aforesaid equilibrium mixture. Thus, it can be seen that unless the pure sulfur dichloride is used immediately after it is prepared, there is a significant degradation, and the resultant equilibrium mixture may not give the desired reaction product when subsequently used as a reaction intermediate. It is a common practice in the industry today for one manufacturer to produce the sulfur dichloride and another manufacturer to purchase this reagent and employ it in production of an intermediate or final product. Generally, a period of several weeks or months passes before the sulfur dichloride produced at one location is used as a reagent at another location. Appreciable deterioration of the sulfur dichloride occurs during this period.

Feher et al., in Zeit. anorg. allge. Chemie, vol. 290 (1957), page 305, disclose a method of stabilizing sulfur dichloride with a small amount of phosphorus trichloride. In this method, sulfur monochloride is chlorinated in the presence of a small proportion of iron powder to produce a reaction product containing sulfur dichloride. After adding a small proportion of phosphorus trichloride, the reaction product is rectified and the sulfur dichloride product recovered. The sulfur dichloride thus obtained, after adding a small additional amount of phosphorus trichloirde, is stored at a temperature of zero degrees centigrade to inhibit chlorine volatilization. Such a technique has some effect upon stabilizing sulfur dichloride, but is impractical from a commercial standpoint because of the expense involved in refrigerating the sulfur dichloride during transportation and storage.

It is an object of the present invention to provide highly concentrated sulfur dichloride stabilized against decomposition.

It is a further object of the invention to provide a method of preparing stabilized sulfur dichloride in a highly concentrated form.

Another object of the present invention is to provide a novel stabilizer for sulfur dichloride.

Still another object of the invention is to substantially inhibit the evolution of chlorine from pure sulfur dichloride while stored for extended periods.

A further object of the invention is to improve the yield of sulfur dichloride when distilling sulfur dichloride from a mixture of sulfur dichloride and sulfur monochloride.

These and other objects of the invention will be apparent from the following detailed description of the invention.

It has now been discovered that when a mixture of sulfur dichloride and sulfur monochloride is distilled in the presence of a stabilizing proportion of phosphorus pentachloride to produce a highly concentrated sulfur dichloride product, and the product thus obtained is admixed with an additional stabilizing proportion of phosphorus pentachloride, the resulting sulfur dichloride product is stabilized against chlorine evolution while stored for extended periods, for example, as long as two months.

It has also been found that any sulfur dichloride containing a minor portion of sulfur monochloride may be treated in accordance with the process of this invention. It is preferred to employ the mixture of sulfur dichloride and sulfur monochloride prepared by the chlorination of sulfur monochloride in the presence of a catalyst such as ferric chloride, carbon, and the like, but such a mixture prepared by any suitable technique may be employed. Such a mixture generally contains at least about sixty-five percent sulfur dichloride, and less than about thirty-five percent sulfur monochloride by weight. Trace amounts of ferric chloride, carbon, and other sulfur chlorides may be present in the mixture. If desired, substantially pure sulfur dichloride may also be stabilized by the technique of the instant invention.

Phosphorus pentachloride is admixed with the impure sulfur dichloride in a proportion between about 0.2 and about 1.0 percent, and preferably between about 0.3 and about 0.6 percent by weight of the impure sulfur dichloride. If the proportion of phosphorus pentachloride is less than about 0.2 percent, the stabilizing effect upon the final product is markedly reduced. A proportion of phosphorus pentachloride in excess of about 1.0 percent has a stabilizing effect, but may unnecessarily adulterate the final product.

Impure sulfur dichloride admixed with phosphorus pentachloride in the above described proportions is then fractionally distilled to produce a substantially pure, highly concentrated sulfur dichloride product. Distillation is effected in a conventional distillation apparatus comprised of a pot, column, condenser, reflux means, condensate receiver, and venting means. The column is provided with sufficient plates or packing, such as Berl saddles, to provide at least about two and one-half theoretical transfer units or plates.

In starting up the fractional distillation operation, the mixture of impure sulfur dichloride and phosphorus pentachloride is charged into the distillation pot and heated to boiling. The boiling temperature of the pot liquor is initially about sixty degrees centigrade, but this temperature gradually increases as the distillation progresses. It is convenient to discontinue the distillation when the pot temperatures rises above about one hundred and twenty degrees centigrade, leaving a small portion of the sulfur dichloride in the pot residue for subsequent recovery.

The vapor or gas phase produce during the distillation step is divided into two fractions on the basis of temperature. The first fraction, or foreshot, is the vapor discharged from the top of the column at a vapor temperature of below about fifty-five degrees centigrade, and preferably below about fifty-eight degrees centigrade. The foreshot is a mixture of chlorine and sulfur dichloride, and comprises generally less than about five percent by weight of the initial charging stock. The foreshot is collected and may be recycled for use in chlorinating sulfur and/or sulfur monochloride to prepare crude sulfur dichloride.

The second vapor fraction, or concentrate fraction, is the vapor leaving the top of the column at a vapor temperature of between about fifty-five and about sixty-five degrees centigrade, and preferably between about fifty-eight and about sixty degrees centigrade. This fraction is liquefied by cooling in the condenser to a temperature below the boiling point, and preferably to a temperature between about thirty and about fifty degrees centigrade. One portion of the resulting condensate is recycled to the top of the column for reflux and the other portion, which is sulfur dichloride in a highly concentrated form, is conveyed to the condensate receiver. A reflux ratio (recycle:product) of between about 1:2 and about 1:4 is preferably employed.

When the vapor temperature at the top of the column rises above about sixty-five degrees centigrade and preferably about sixty degrees centigrade, the distillation is stopped. Although the distillation is controlled by the vapor temperature, it is desirable to stop the distillation when the pot residue reaches a temperature of about one hundred and twenty degrees centigrade, and preferably about one hundred degrees centigrade. Pot temperatures above about one hundred and twenty degrees centigrade should be avoided because of the relatively high proportion of sulfur monochloride vaporized at such temperatures. The pot residue, which is predominantly sulfur monochloride, may be recycled to the chlorination step wherein sulfur monochloride is chlorinated to produce impure sulfur dichloride in accordance with prior art techniques.

The concentrated sulfur dichloride condensate collected in the condensate receiver is admixed with phosphorus pentachloride, the proportion of phosphorus pentachloride being equivalent to between about 0.2 and about 1.0 percent, and preferably between about 0.3 and about 0.6 percent by weight of the sulfur dichloride condensate. The resulting mixture, which is highly concentrated sulfur dichloride containing less than about five percent sulfur monochloride, may be stored for almost two months without significant loss of chlorine or other decomposition.

It will be recognized by those skilled in the art, that the type of packing, the number of theoretical plates and the reflux ratio employed in the distillation step to give the optimum yield of sulfur dichloride may vary with the particular type of distillation apparatus employed.

It has been found that when impure sulfur dichloride is distilled in the absence of phosphorus pentachloride, and then a small proportion of phosphorus pentachloride is admixed with the pure sulfur dichloride condensate, stabilization of the sulfur dichloride is not readily effected. Thus, it is essential to the instant invention to add phosphorus pentachloride to the impure sulfur dichloride during distillation as well as to the concentrated product produced in the distillation step.

The following example is presented to explain the invention more completely, without any intention of being limited thereby. All parts and percentages are by weight unless otherwise specified.

*Example*

A crude mixture of sulfur dichloride and sulfur monochloride, containing about seventy-five percent sulfur dichloride, prepared by the chlorination of sulfur monochloride in the presence of a ferric chloride catalyst, was used in the following tests.

Distillation of the crude mixture was effected in a distillation unit comprised of a distillation pot, a packed column, a condenser, reflux means, a condensate receiver, and venting means. The distillation pot had a volume of about two liters and was heated by means of a standard laboratory hemispherical electrical heating mantle. A Pyrex glass column, three-quarters of an inch in diameter by fifteen inches, packed with one-quarter inch Berl saddles, was secured to the top of the distillation pot. The condensate receiver had a volume of about one liter. Temperature measuring means were provided in the pot and in the vapor line at the top of the column. Two thousand grams of crude sulfur dichloride were admixed with ten grams of phosphorus pentachloride in the distillation pot and the resulting mixture was heated from ambient temperature to produce a final vapor temperature of about sixty degrees centigrade and a final pot temperature of about one hundred and twenty degrees centigrade. Three vapor fractions were collected during the heating period. The foreshot, i.e., vapor produced at a vapor temperature of between about forty and about fifty-five degrees centigrade was condensed, collected and weighed. This fraction comprised about 0.8 percent of the charging stock. The vapor having a temperature of between fifty-five and sixty degrees centigrade was condensed and collected in the condensate receiver, while maintaining a reflux ratio of about 1:3. This fraction, which was the concentrated sulfur dichloride, comprised 71.6 percent of the charging stock, indicating a recovery equivalent to about ninety-five percent of the sulfur dichloride originally present in the feed. Vapors given off at a temperature above sixty degrees centigrade were condensed and combined with the pot residue. The combined residue, which was predominantly sulfur monochloride, comprised 19.8 percent of the charging stock. A loss of 7.8 percent of the charging stock during the distillation step was indicated by difference.

The concentrated sulfur dichloride fraction, which weighed one thousand, four hundred and thirty-three grams, was admixed with seven grams of phosphorous pentachloride and stored at room temperature in a closed container. The sulfur monochloride content of the purified, stabilized product was determined from time to time by quantitative analyses. The results are set forth in the table.

For purposes of comparison, the above procedure was repeated, employing phosphorus trichloride, instead of phosphorus pentachloride as the stabilizer. The percent sulfur dichloride in the product is set forth in the following table.

| Storage Time, Days | Percent S₂Cl₂ in SCl₂ Product | |
|---|---|---|
| | PCl₅ | PCl₃ |
| 1 | | 3 |
| 13 | | 8 |
| 21 | 3 | |
| 59 | 9.5 | |

A comparison of the results shows that the sulfur dichloride product, when stabilized with phosphorus trichloride as in the prior art, contained three percent sulfur monochloride after only one day of storage, while sulfur dichloride treated with phosphorus pentachloride in accordance with the instant invention was stored for twenty-one days before the same degree of decomposition occurred. In addition, the product treated with phosphorus trichloride contained eight percent sulfur monochloride after only thirteen days storage, while the product treated with phosphorus pentachloride contained only 9.5 percent sulfur monochloride after fifty-nine days storage.

It will be noted that excellent results are obtained when the present invention is used in conjunction with the process disclosed and claimed in my copending patent application S.N. 852,228, filed of even date therewith. This application discloses that sulfur dichloride is stabilized with a stabilizing proportion of a sulfur-bearing compound of phosphorus and/or bismuth. In addition, the process of the present invention may be advantageously used in conjunction with the process disclosed and claimed in my copending patent application S.N. 852,227, filed of even date herewith. This application discloses that sulfur dichloride is stabilized with a stabilizing proportion of an organic phosphorus compound.

It will be understood that various modifications within the invention are possible, some of which are referred to above. Therefore, I do not wish to be limited except as defined by the appended claims.

I claim:

1. The method of preparing stabilized sulfur dichloride which comprises admixing sulfur dichloride with a stabilizing proportion of phosphorus pentachloride, distilling the resulting mixture, recovering concentrated sulfur dichloride from said distillation step, and admixing a stabilizing proportion of phosphorus pentachloride with said concentrated sulfur dichloride, whereby the resulting product is stabilized against decomposition.

2. The method of preparing stabilized sulfur dichloride which comprises admixing sulfur dichloride with a stabilizing proportion of between about 0.2 and about 1.0 percent by weight of phosphorus pentachloride, distilling the resulting mixture, recovering concentrated sulfur dichloride from said distillation step, and admixing a stabilizing proportion of between about 0.2 and about 1.0 percent by weight of phosphorus pentachloride with said concentrated sulfur dichloride, whereby the resulting product is stabilized against decomposition.

3. The method of claim 1 wherein said sulfur dichloride prior to distillation, contains at least about sixty-five percent by weight of sulfur dichloride and less than about thirty-five percent by weight of sulfur monochloride.

4. The method of preparing stabilized sulfur dichloride which comprises admixing phosphorus pentachloride with impure sulfur dichloride containing at least about sixty-five percent by weight of sulfur dichloride and less than about thirty-five percent by weight of sulfur monochloride, the proportion of phosphorus pentachloride being between about 0.2 and about 1.0 percent by weight of said impure sulfur dichloride, heating said mixture to the boiling point whereby a vapor is produced, recovering the vapor fraction having a vapor temperature in the range between about fifty-five and about sixty-five degrees centigrade while heating said mixture, cooling said vapor fraction to a temperature sufficient to effect liquefication thereof, whereby concentrated sulfur dichloride is produced, and admixing phosphorus pentachloride with said concentrated sulfur dichloride in a proportion between about 0.2 and about 1.0 percent by weight of said concentrated sulfur dichloride, whereby the resulting product is stabilized against decomposition.

5. The method of claim 4 wherein said vapor fraction is recovered at a vapor temperature in the range between about fifty-eight and about sixty degrees centigrade.

6. A novel sulfur dichloride composition stabilized against decomposition comprised of sulfur dichloride containing a stabilizing proportion of phosphorus pentachloride.

7. A novel sulfur dichloride composition stabilized against decomposition comprised of sulfur dichloride containing a stabilizing proportion of between about 0.2 and about 1.0 percent by weight of phosphorus pentachloride.

8. In a method of preparing stabilized sulfur dichloride which comprises a chlorinating step in which a sulfur compound selected from the group consisting of sulfur, sulfur monochloride, and mixtures thereof is chlorinated, whereby an impure sulfur dichloride product containing sulfur monochloride is produced, said impure sulfur dichloride is distilled, and a concentrated sulfur dichloride product, a residue predominating in sulfur monochloride, and a foreshot predominating in chlorine are produced thereby, the improvement which comprises admixing a stabilizing proportion of phosphorus pentachloride with said impure sulfur dichloride prior to distillation, recycling said foreshot and said residue to said chlorinating step, and admixing a stabilizing proportion of phosphorus pentachloride with said concentrated sulfur dichloride, whereby the resulting product is stabilized against decomposition.

References Cited in the file of this patent

UNITED STATES PATENTS 961,530    Quayle _____ June 14, 1910

OTHER REFERENCES

Van Wazer: "Phosphorus and Its Compounds," vol. I. Chemistry, Interscience Publishers, Inc., New York, 1958, page 242.